(12) United States Patent
Lee (10) Patent No.: US 11,329,895 B2
(45) Date of Patent: May 10, 2022

(54) METHOD AND SYSTEM FOR MEASURING QUALITY OF GLOBAL CLOUD NETWORK

(71) Applicant: NAVER CLOUD CORPORATION, Seongnam-si (KR)

(72) Inventor: Ho Jin Lee, Seongnam-si (KR)

(73) Assignee: NAVER CLOUD CORPORATION, Seongnam-si (KR)

( * ) Notice: Subject to any disclaimer, the term of this patent is extended or adjusted under 35 U.S.C. 154(b) by 0 days.

(21) Appl. No.: 17/034,693

(22) Filed: Sep. 28, 2020

(65) Prior Publication Data

US 2021/0099361 A1   Apr. 1, 2021

(30) Foreign Application Priority Data

Sep. 30, 2019  (KR) ........................ 10-2019-0121125

(51) Int. Cl.
*H04L 41/5009* (2022.01)
*H04L 43/045* (2022.01)
*H04L 43/55* (2022.01)
*H04L 43/0864* (2022.01)

(52) U.S. Cl.
CPC ...... *H04L 41/5009* (2013.01); *H04L 41/5038* (2013.01); *H04L 43/045* (2013.01); *H04L 43/0864* (2013.01)

(58) Field of Classification Search
CPC ............... H04L 41/5009; H04L 43/045; H04L 41/5038; H04L 43/0864
See application file for complete search history.

(56) References Cited

U.S. PATENT DOCUMENTS

| 10,015,173 | B1 | 7/2018 | Efstathopoulos |
| 2002/0099816 | A1 | 7/2002 | Quarterman et al. |
| 2004/0039938 | A1* | 2/2004 | Katz ................. H04L 63/1458 726/2 |
| 2008/0209028 | A1* | 8/2008 | Kurup ................ H04L 29/06 709/224 |
| 2010/0220616 | A1* | 9/2010 | Glyakov ............ H04L 43/0852 370/252 |
| 2014/0270157 | A1* | 9/2014 | Youd .................... G06F 16/21 380/44 |

FOREIGN PATENT DOCUMENTS

KR   101561420 B1   10/2015

OTHER PUBLICATIONS

Jens Myrup Pedersen et al.; "Assessing Measurements of QoS for global Cloud Computing Services"; 2011 IEEE Ninth Int'l. Conference on Dependable, Autonomic and Secure Computing; pp. 682-689.

(Continued)

*Primary Examiner* — Philip C Lee
(74) *Attorney, Agent, or Firm* — Greer Burns & Crain Ltd.

(57) ABSTRACT

A global cloud network quality measurement method may include generating an Internet protocol (IP) list of open web servers having at least one externally open port for each country; collecting packet data through communication with each of the open web servers based on the IP list; and analyzing a network quality with respect to at least one of a region, an Internet service provider (ISP), and an autonomous system number (ASN) based on the collected packet data.

15 Claims, 9 Drawing Sheets

(56) References Cited

OTHER PUBLICATIONS

Naver Cloud Platform; "Various traffic information monitoring by analyzing packet information"; Network Traffic Monitoring—Management; pp. 1-5 https://web.archive.org/web/20190403144722/https://www.ncloud.com/product/management/ntm.

Korean Office Action dated Nov. 12, 2020 by the Korean Patent Office corresponding to Korean patent application No. 10-2019-0121125.

Japanese Office Action issued in corresponding Japanese patent application No. 2020-163644, dated Aug. 10, 2021.

Office Action issued in corresponding Japanese patent application No. 2020-163644, dated Mar. 29, 2022.

Kuki Ueyama; Proposed Dynamic DC Selection Method for Minimizing Communication Delay in NTMobile, 76th (2016) National Convention Lecture Paper (3) Network Security, Mar. 11, 2014.

\* cited by examiner

METHOD AND SYSTEM FOR MEASURING QUALITY OF GLOBAL CLOUD NETWORK

CROSS-REFERENCE TO RELATED APPLICATION(S)

This U.S. non-provisional application claims the benefit of priority under 35 U.S.C. § 119 to Korean Patent Application No. 10-2019-0121125 filed on Sep. 30, 2019, in the Korean Intellectual Property Office (KIPO), the entire contents of which are incorporated herein by reference.

BACKGROUND OF THE INVENTION

Field of Invention

One or more example embodiments of the following description relate to a method and system for measuring the quality of a global cloud network.

Description of Related Art

To provide a global cloud service infrastructure, cloud platforms need to be built in many countries. Each of the cloud platforms may provide a global cloud service infrastructure to a country in which a corresponding cloud platform is installed and neighboring countries, and may connect to individual users of each country through a specific Internet service provider (ISP) of each country in individual countries. For example, consider a case in which a Korean game company contracts with an infrastructure provider and provides a game service to users in Indonesia through a global cloud service infrastructure of the infrastructure provider. Here, with the assumption that cloud platforms are built in Korea and Singapore, respectively, the Korean game company may construct a game server in the cloud platform built in Korea and the game server may provide the game service to users in Indonesia through the cloud platform built in Singapore and an ISP in Indonesia.

Here, ISPs of individual countries hold technologies for measuring the quality of their own circuits. For example, a dedicated terminal for measuring the quality of an Internet line and a method of operating the dedicated terminal is described in Korean Registered Patent NO. 10-1561420. Also, the line quality may be simply measured among cloud platforms installed in many countries. Also, by arranging a device (e.g., a personal computer (PC), a laptop computer, etc., hereinafter, referred to as an "agent device") installed with a quality measurement agent in a corresponding country, the quality of a line from a cloud platform to individual users may be measured. In the aforementioned example, infrastructure providers may deploy devices installed with quality measurement agents in Indonesia, may measure the quality of their global cloud service infrastructure through communication with game servers built in a cloud platform in Korea through a specific ISP in Indonesia, and may report a measurement result to the corresponding game company.

However, there are often no agent devices secured for a desired country, a specific city in the desired country, or a specific ISP in the desired country. For example, to acquire the quality for a desired country, city, or ISP at a desired time, agent devices connected to various countries, cities, and ISPs need to operate at all times and thus, very high cost may be required for management and operation. In addition, due to a cost issue, a number of agent devices operable at all times is small. Therefore, the coverage and quality of data measured through only agent devices are difficult to have representativeness.

BRIEF SUMMARY OF THE INVENTION

One or more example embodiments provide a method and a system for measuring the quality of a global cloud network that may improve the quality competitiveness by verifying and managing the quality of a network from a quality measurement server to a final user for each region, covered by a cloud platform, such as a country, a city, and the like, and/or Internet service provider (ISP).

According to an aspect of at least one example embodiment, there is provided a method of measuring the quality of a global cloud network using a computer apparatus including at least one processor, the method including, by the at least one processor, generating an Internet protocol (IP) list of open web servers having at least one externally open port for each country; collecting packet data through communication with each of the open web servers based on the IP list; and analyzing a network quality with respect to at least one of a region, an Internet service provider (ISP), and an autonomous system number (ASN) based on the collected packet data.

The generating of the IP list may include scanning open web servers having at least one externally open port based on IP band information for each ISP of a country for measuring the network quality.

The collecting of the packet data may include transmitting a request packet for requesting a session connection to an address generated based on an IP of the IP list and an externally open port; receiving a response packet corresponding to the transmitted request packet from an open web server corresponding to the address; and collecting information about the request packet and the response packet as the packet data.

The collecting of the packet data may include transmitting a hypertext transfer protocol (HTTP) packet through a session connected to the open web server corresponding to the address through the response packet; receiving an HTTP response packet corresponding to the transmitted HTTP packet from the open web server corresponding to the address; and further collecting information about the HTTP packet and the HTTP response packet as the packet data.

The global cloud network quality measurement method may further include calculating a network latency for each of the open web servers based on the request packet and the response packet; calculating an application latency for each of the open web servers based on the HTTP packet and the HTTP response packet; and determining a portion in which a failure occurs between a network and an application through comparison between the network latency and the application latency in response to an occurrence of the failure.

The collecting of the packet data may include mapping the collected packet data to at least one of a corresponding region, ISP, and ASN; and indexing the collected packet data.

The analyzing of the network quality may include calculating a latency for each of the open web servers based on the collected packet data; and calculating an average latency corresponding to at least one of the region, the ISP, and the ASN.

The global cloud network quality measurement method may further include providing a dashboard for displaying information about the analyzed network quality.

The providing of the dashboard may include receiving a selection on a cloud platform for providing a service and a region to which the service is to be provided through a user interface of the dashboard; and displaying an average latency corresponding to at least one of a region selected based on a latency calculated through the collected packet data, an ISP of the selected region, and an ASN of the selected region.

According to an aspect of at least one example embodiment, there is provided a non-transitory computer-readable record medium storing instructions that, when executed by a processor, cause the processor to perform the global cloud network quality measurement method.

According to an aspect of at least one example embodiment, there is provided a computer apparatus including a memory configured to store computer-readable instructions; and at least one processor configured to execute the instructions. The at least one processor is configured to generate an Internet protocol (IP) list of open web servers having at least one externally open port for each country, collect packet data through communication with each of the open web servers based on the IP list, and analyze a network quality with respect to at least one of a region, an Internet service provider (ISP), and an autonomous system number (ASN) based on the collected packet data.

According to some example embodiments, it is possible to improve the quality competitiveness by verifying and managing the quality of a network from a quality measurement server to a final user for each region covered by a cloud platform, such as a country, a city, and the like, ISP and/or ASN.

Also, according to some example embodiments, it is possible to achieve the average network quality in a desired section anywhere in the world through a method of attempting a session connection to ports of various types of open web servers in the world.

Further regions of applicability will become apparent from the description provided herein. The description and specific examples in this summary are intended for purposes of illustration only and are not intended to limit the scope of the present disclosure.

BRIEF DESCRIPTION OF THE DRAWINGS

Example embodiments will be described in more detail with regard to the figures, wherein like reference numerals refer to like parts throughout the various figures unless otherwise specified, and wherein.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION OF THE INVENTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware and/or a combination of hardware and software. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor), Central Processing Unit (CPU), a controller, an arithmetic logic unit (ALU), a digital signal processor, a microcomputer, a microprocessor, etc., the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable storage mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive, solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blue-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings.

Figure 1:
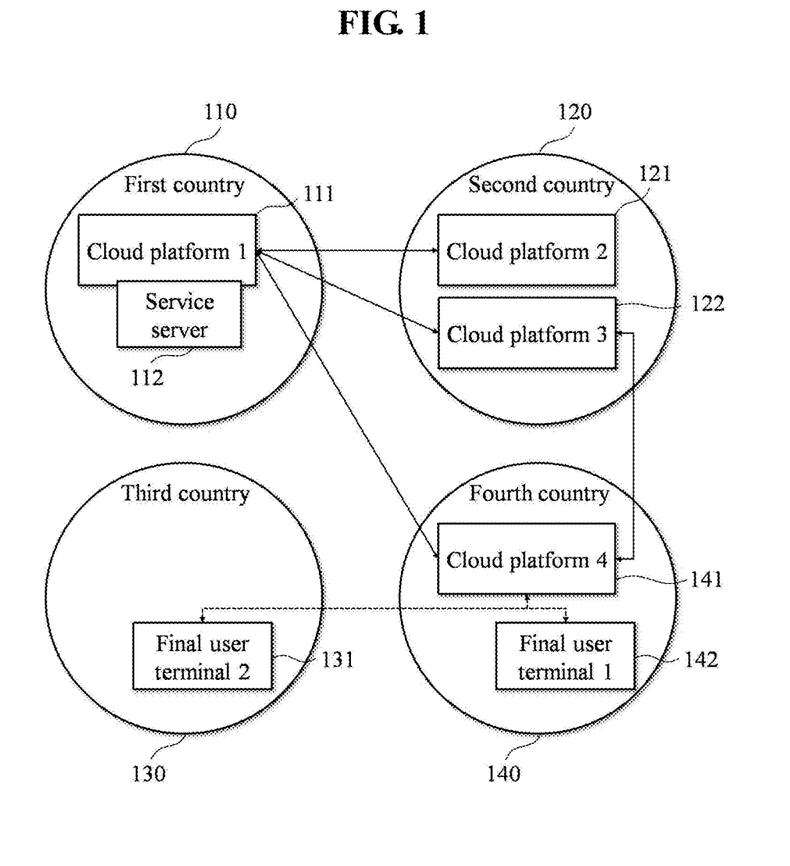
FIG. 1 illustrates an example of cloud platforms installed in a plurality of countries according to an example embodiment.

FIG. 1 illustrates an example of cloud platforms installed in a plurality of countries according to an example embodiment. FIG. 1 illustrates a cloud platform 1 111 built in a first country 110, a cloud platform 2 121 and a cloud platform 3 122 built in a second country 120, and a cloud platform 4 141 built in a fourth country 140 by an infrastructure provider. Here, it is assumed that a separate cloud platform is absent in a third country 130, and bidirectional solid lines represent global lines built between such cloud platforms. For example, a service provider of the first country 110 may build a service server 112 using an infrastructure of the cloud platform 1 111 of the infrastructure provider, and may provide a service of the service provider to a final user terminal 1 142 of the fourth country 140 through an Internet service provider (ISP) of the fourth country 140 that is connected to the cloud platform 4 141 using a global line between the cloud platform 1 111 and the cloud platform 4 141. Here, a bidirectional dotted line between the cloud platform 4 141 and the final user terminal 142 may represent a line of the ISP of the fourth country 140. Also, with the assumption that the third country 130 and the fourth country 140 are substantially close to each other, a line of an ISP of the third country 130 may be connected to the cloud platform 4 141 built in the fourth country 140. In this case, a final user terminal 2 131 of the third country 130 may also be provided with the service from the service server 112 of the first country 110 through the cloud platform 4 141. The service provider may pay the infrastructure provider for cost for using the infrastructure.

As described above, service providers may be provided with a global service using an infrastructure of an infrastructure provider. Here, the service providers may desire to verify the quality of the global service in using the infrastructure of the infrastructure provider. That is, the service providers may have interest in a speed at which clients, that is, final users, may experience when the service providers provide their services in a specific country. Accordingly, there is a need to measure Lastmile network latency for global clients.

There are a large number of open web servers in the world, such as, for example, general service web servers, webs for managing wired/wireless routers used in general homes, webs for managing network equipment in apartments, Internet protocol televisions (IPTVs), set-top boxes, home Internet of things (IoTs) equipment, and the like. Such open web servers have ports that are externally open and used. Accordingly, the example embodiment may measure the average network service quality in a desired section anywhere by transmitting a packet, for example, a transmission control protocol (TCP) sync packet for initiating a session connection with open ports of the open web servers and by measuring a round trip time (RTT) for a packet, for example, a TCP syn+ack packet, that immediately returns in response to the transmitted packet.

Figure 2:
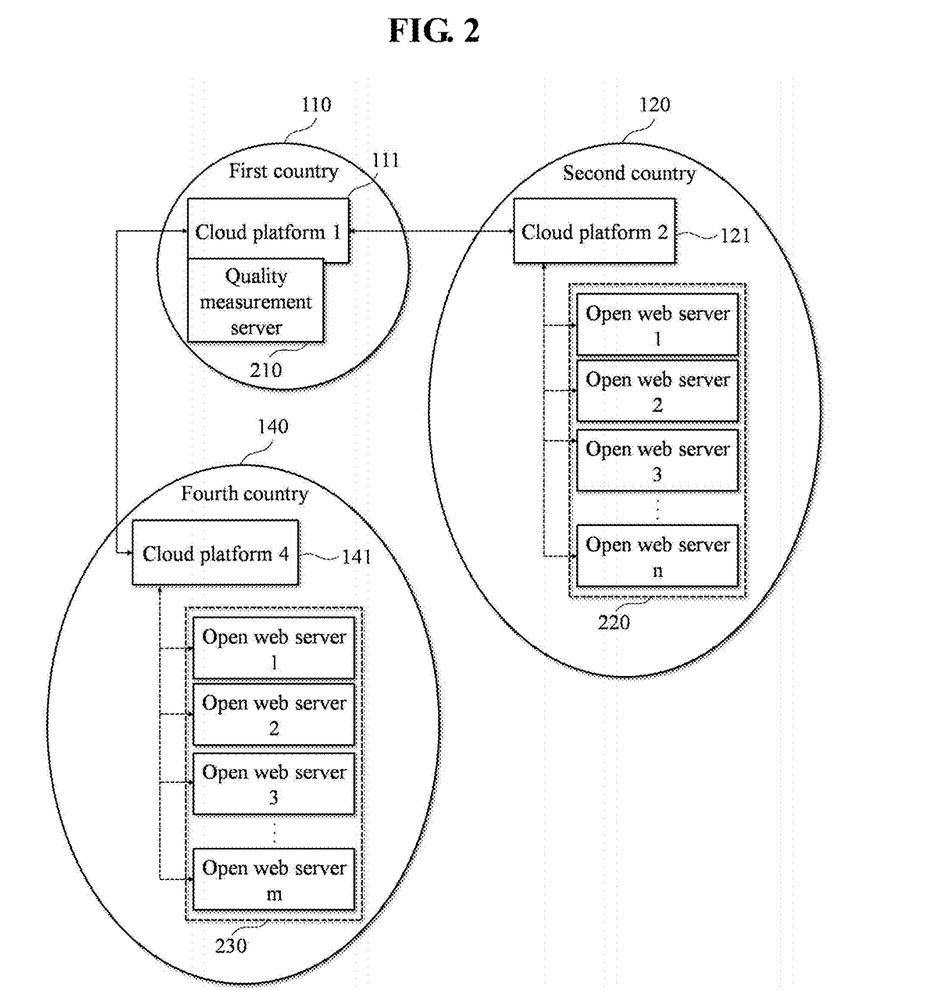
FIG. 2 illustrates an example of measuring a network quality through a session connection with open web servers according to an example embodiment.

FIG. 2 illustrates an example of measuring a network quality through a session connection with open web servers according to an example embodiment. Referring to FIG. 2, a quality measurement server 210 implemented in the cloud platform 1 111 of the first country 110 may transmit packets for attempting a session connection to open ports of open web servers 220 of the second country 120 through the cloud platform 2 121 of the second country 120. Here, if response packets for the transmitted packets are received, the quality measurement server 210 may measure the average network quality for a region covered by the cloud platform 2 121, that is, a region of the second country 120.

Likewise, the quality measurement server 210 may measure the average network quality for each region by measuring the network quality for open web servers for each region through cloud platform built in various regions. Referring again to FIG. 2, the quality measurement server 210 may attempt a session connection with open web servers 230 of the fourth country 140 through the cloud platform 4 141 of the fourth country 140 and may measure the average network quality for a region covered by the cloud platform 4 141, that is, a region of the fourth country 140.

While the related art of measuring the network quality using agent equipment has some constraints due to incapability of realistically deploying a large number of agent equipment, a number of open web servers is relatively large. Therefore, the average network quality acquired by the open web servers may represent the network quality for a corresponding region. Also, the average network quality may be measured for each ISP by using IP band information for each ISP of a country that desires quality measurement. Meanwhile, to transmit a packet for a session connection with a specific port of open web servers, externally open port information may be required. To this end, the quality measurement server 210 may acquire information of ports by directly scanning each of the ports of the open web servers or may purchase and use a database, for example, a shodan database, in which information of the ports are constructed in advance. If such information about the ports is acquired, the quality measurement server 210 may attempt a session connection to an address corresponding to an IP and a port and may measure the network quality for each country, each region, and each ISP by operating an RTT value for each country, each region, and each ISP based on timestamp information of a packet transmitted to each of the open web servers and a packet transmitted as a response to the corresponding packet from each of the open web servers. Depending on example embodiments, the network quality may be measured by operating an RTT value for each autonomous system number (ASN), which is described below.

Although FIG. 2 illustrates an example embodiment in which the quality measurement server 210 implemented in the cloud platform 1 111 of the first country 110 attempts a session connection with open web servers of another country, the network quality for each management region may be measured for each cloud platform by building a quality measurement server for each cloud platform.

Figure 3:
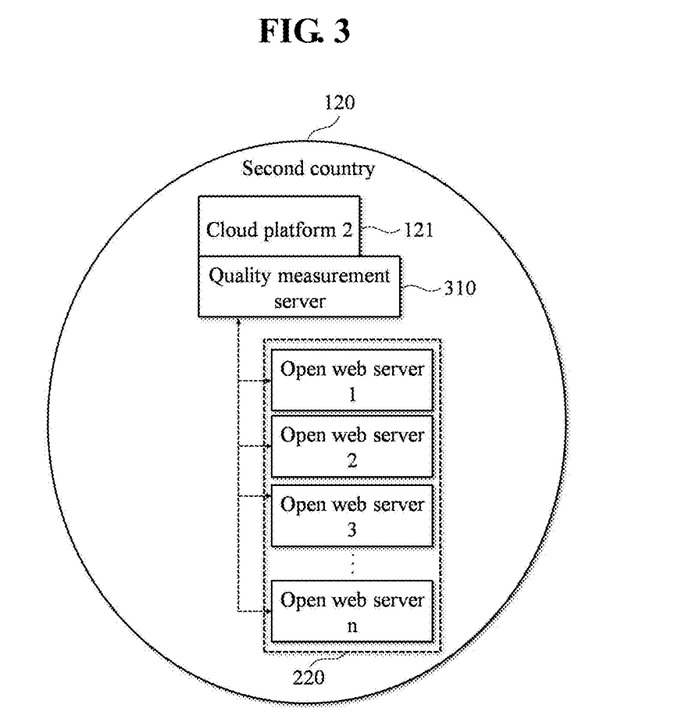
FIG. 3 illustrates another example of measuring a network quality through a session connection with open web servers according to an example embodiment.

FIG. 3 illustrates another example of measuring the network quality through a session connection with open web servers according to an example embodiment. Referring to the example embodiment of FIG. 3, a quality measurement server 310 implemented in the cloud platform 2 121 of the second country 120 may measure the network quality by attempting a session connection to the open web servers 220 of a region covered by the cloud platform 2 121.

Likewise, a quality measurement server may be implemented for each cloud platform and may measure the network quality for each region covered by each of cloud platforms.

Also, if it is possible to identify geographical locations of open web servers through an IP band used by an ISP for each country, the network quality may be measured for each detailed region. For example, the average network quality may be measured for each relatively small unit region, such as a city.

Figure 4:
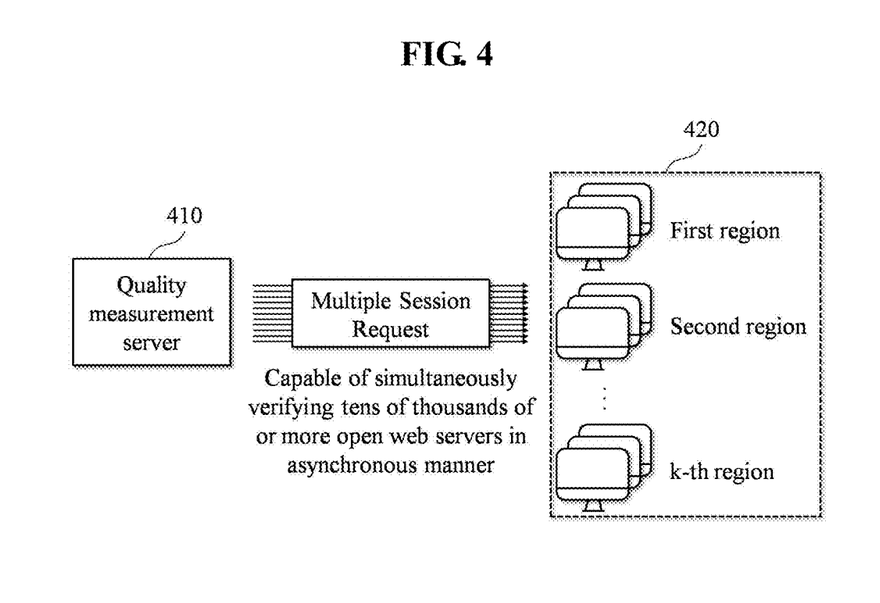
FIG. 4 illustrates an example of a latency measurement method according to an example embodiment.

FIG. 4 illustrates an example of a latency measurement method according to an example embodiment. Referring to FIG. 4, a quality measurement server 410 may measure the network quality for each of open web servers 420 by transmitting a plurality of session requests to the plurality of open web servers 420 present in a plurality of regions and by asynchronously receiving responses from the open web servers 420. For example, the quality measurement server 410 may acquire an IP list (IP and port) for the open web servers 420 by scanning ports according to the respective IP addresses based on a global IP database, and may transmit a session request to the open web servers 420 based on the acquired IP list.

Figure 5:
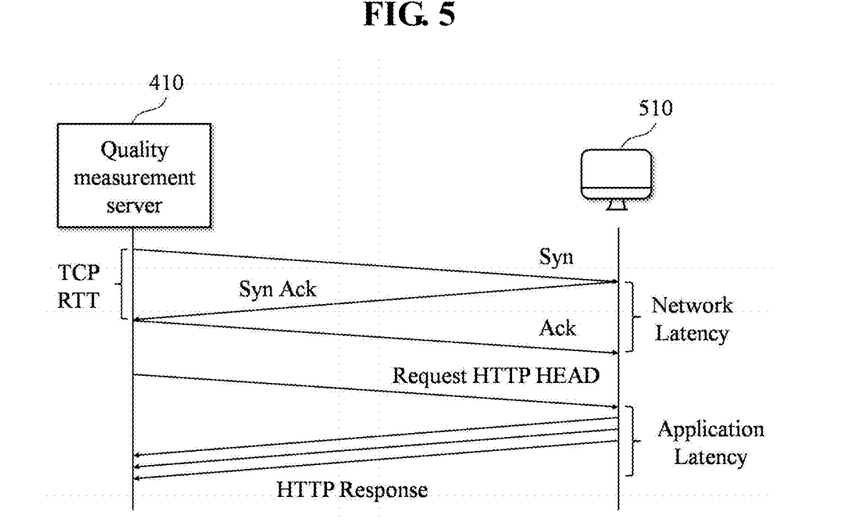
FIG. 5 illustrates an example of a latency measurement process according to an example embodiment.

FIG. 5 illustrates an example of a latency measurement process according to an example embodiment. Referring to FIG. 5, the quality measurement server 410 may forward a packet for requesting a session connection, such as 'Sync' to an open web server 510. In response to receiving 'Syn,' the open web server 510 may transmit a response packet 'Syn Ack' to the quality measurement server 410. The quality measurement server 410 may measure a TCP RTT based on a transmission time of 'Syn' and a reception time of 'Syn Ack.' The measured TCP RTT may be stored with information about a region (a country, a city, and the like) of the open web server 510 and/or information about an ISP used by the open web server 510. Here, as the TCP RTT is stored for the plurality of open web servers, the network quality may be measured for each region and/or ISP.

Meanwhile, in response to receiving the response packet 'Syn Ack,' the quality measurement server 410 may immediately transmit a response packet 'Ack' to the open web server 510. In this case, the open web server 510 may measure a network latency based on the transmission time of 'Syn Ack' and a reception time of 'Ack' that is a response packet.

Also, if a session is established between the quality measurement server 410 and the open web server 510, the quality measurement server 410 may exchange packets 'Request HTTP HEAD' and 'HTTP Response' with the open web server 510 through the established session and may measure application latency through the packets exchanged through the established session.

Although the network latency and the application latency need to be separately measured, many measurement instruments measure the network quality using an application. To solve this issue, the example embodiment may measure a more accurate network quality by measuring the network latency based on a TCP RTT of a transport layer. Also, if a failure occurs, a portion in which the failure occurs between a network and the open web server 510 may be verified by comparing the network latency and the application latency.

Figure 9:
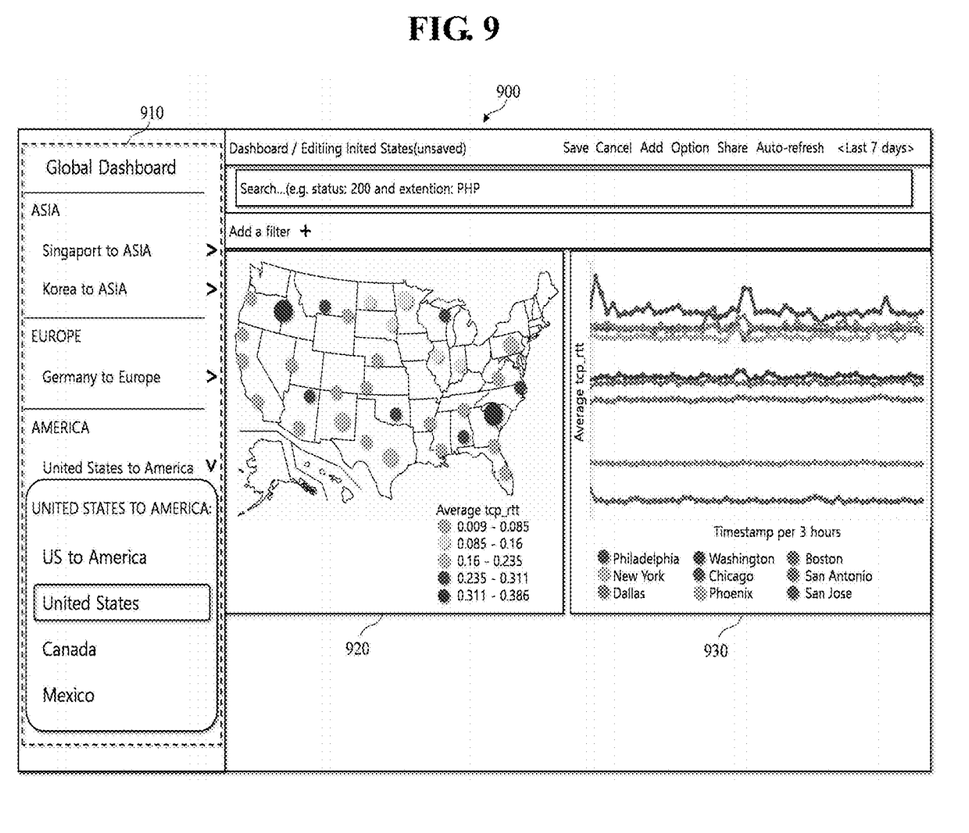
FIG. 9 illustrates an example of a dashboard according to an example embodiment.

Meanwhile, a dashboard for providing information about the measured network quality may be provided (see, e.g., FIG. 9). The dashboard may provide a user interface for analyzing collected information and providing information about the network quality in a desired region and/or for each ISP.

For example, the dashboard may include information about a relationship between a cloud platform and a region. In this case, if a specific cloud platform provides a service to a first area, a user may be provided with information about a network quality through the dashboard. Here, the user may be provided with information about the network quality for the entire first region or each of subregions included in the first region. For example, a case in which a cloud platform built in 'Singapore' provides a service to 'Asia' that includes 'Singapore,' 'Hongkong,' 'Taiwan,' 'Philippines,' 'Korea,' 'Japan,' 'Vietnam,' 'Thailand,' and 'Indonesia' may be considered. Here, the user may receive information about network quality for a case in which the user selects 'Asia' or selects a subregion, for example, 'Vietnam' and the cloud platform built in 'Singapore' provides the service to 'Asia' or 'Vietnam.' As another example, the user may receive information about network quality for a case in which a cloud platform built in 'Korea' provides a service to 'Asia' or 'Vietnam.' In this case, a service provider that desires to provide a service to final users in 'Vietnam' may compare the cloud platform built in 'Korea' and the cloud platform built in 'Singapore regarding where to implement a service server of the service provider in order to provide the better network quality to final users using the service of the service provider.

In response to a selection on a cloud platform for providing a service and a specific country to which the service is to be provided, information in which the average TCP RTT for each region is displayed on a map by combining geographical information, such as a map of the corresponding specific country, and information about the network quality; information in which TCP RTT for each ISP of the selected country is represented as a graph; information in which TCP RTT over time is represented as a graph for each ISP of the selected country; and/or information in which the TCP RTT over time is represented as a graph for each ASN of the selected country may be configured and thereby displayed on a single screen. Here, the TCP RTT over time may be used to detect an occurrence of Distributed Denial of Service (DDoS) attacks in a specific region. An autonomous system (AS) may be managed and controlled as belonging to a single organization in terms of management and may be identified based on a unique number, an ASN, as a network or a network group using the same routing policy.

Figure 6:
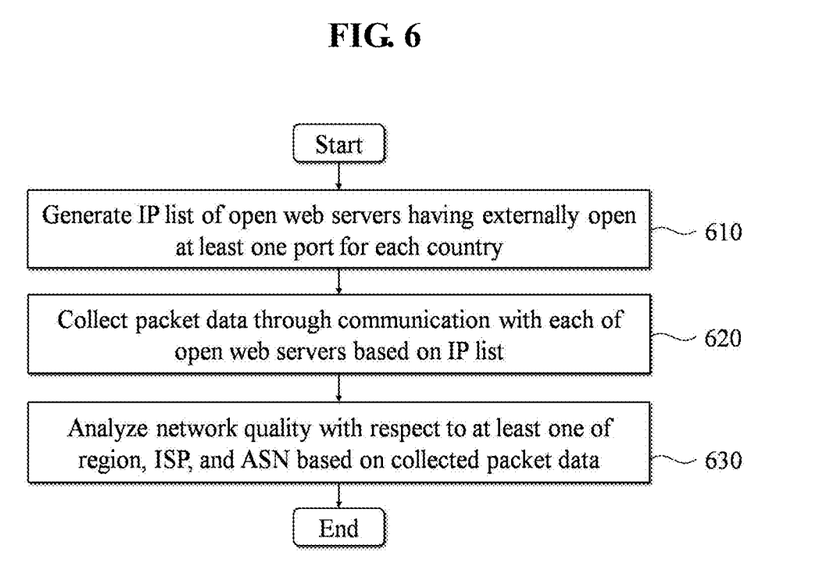
FIG. 6 is a flowchart illustrating a method of measuring the quality of a global cloud network according to an example embodiment.

FIG. 6 is a flowchart illustrating an example of a method of measuring the quality of a global cloud network according to an example embodiment. The global cloud network quality measurement method of FIG. 6 may be performed by at least one computer apparatus, for example, a computer apparatus 700 of FIG. 7, configured to implement a quality measurement server. Here, the quality measurement server may correspond to any one of the quality measurement server 210, the quality measurement server 310, and the quality measurement server 410. A processor 720 of the computer apparatus 700 may be configured to execute a control instruction according to a code of at least one computer program or a code of an OS included in a memory 710. Here, the processor 720 may control the computer apparatus 700 to perform operations 610 to 630 included in the global cloud network quality measurement method of FIG. 6 in response to a control instruction provided from a code stored in the computer apparatus. Referring to FIG. 8, the processor 720 may include an IP list generator 810, a packet data collector 820, and a network quality analyzer 830 of FIG. 8. The IP list generator 810, the packet data collector 820, and the network quality analyzer 830 may be functional expressions of the processor 720 for performing operations 610 to 630.

Referring to FIG. 6, in operation 610, the IP list generator 810 may generate an IP list of open web servers having at least one externally open port for each country. For example, the IP list generator 810 may generate the IP list by scanning open web servers having at least one externally open port based on IP band information for each ISP of a country for measuring the network quality. Depending on example embodiments, information that is pre-configured for an externally open port and on sales may be used.

In operation 620, the packet data collector 820 may collect packet data through communication with each of the open web servers based on the IP list. For example, the packet data collector 820 may transmit a request packet for requesting a session connection to an address generated based on an IP of the IP list and an externally open port and may receive a response packet corresponding to the transmitted request packet from an open web server corresponding to the address. In this case, the packet data collector 820 may collect information about the request packet and the response packet as the packet data. Also, as described above with reference to FIG. 5, the computer apparatus 700 may transmit an HTTP packet through a session connected to the open web server corresponding to the address through the response packet and may receive an HTTP response packet corresponding to the transmitted HTTP packet from the open web server corresponding to the address. In this case, the computer apparatus 700 may further collect information about the HTTP packet and the HTTP response packet as the packet data. Here, as described above with reference to FIG. 5, the request packet and the response packet may be used to measure the network latency, and the HTTP packet and the HTTP response packet may be used to measure the application latency. In response to an occurrence of a failure, the computer apparatus 700 may determine a portion in which the failure occurs between a network and an application through comparison between the network latency and the application latency.

The computer apparatus 700 may map the packet data collected in operation 620 to at least one of a corresponding region, ISP, and ASN, and may index the collected packet data. That is, a database in which packet data collected for each region, packet data collected for each ISP, and/or packet data collected for each ASN are indexed may be generated.

In operation 630, the network quality analyzer 830 may analyze a network quality for at least one of a region, an ISP, and an ASN based on the collected packet data.

For example, the network quality analyzer 830 may calculate a latency for each of the open web servers based on the collected packet data and may calculate an average latency corresponding to at least one of the region, the ISP, and the ASN. The calculated average latency may be used to display information about the network quality through the aforementioned dashboard. For example, the network quality analyzer 830 may provide the dashboard for displaying information about the analyzed network quality. Here, the network quality analyzer 830 may receive a selection on a cloud platform for providing a service and a region to which the service is to be provided through a user interface of the dashboard and may display an average latency corresponding to at least one of a region selected based on a latency calculated through the collected packet data, an ISP of the selected region, and an ASN of the selected region.

Referring to FIG. 9, a dashboard 900 in accordance with one embodiment may include a first interface 910 through which a user may select a region (for example, a country), a second interface 920 that displays information about the network quality of the region selected through the first interface 910 on a map of the region, and a third interface 930 that graphically displays information about the network quality of the region selected through the first interface 910. When a plurality of regions are selected through the first interface 910, the second interface 920 and the third interface 930 may display the network quality of each of the selected plurality of regions.

Since a large number of open web servers may be present for a region, such as a country or a city, an ISP or an ASN of the corresponding region, and the like, the average latency for the open web servers may have representativeness capable of representing the corresponding region, the corresponding ISP, or the corresponding ASN.

Figure 7:
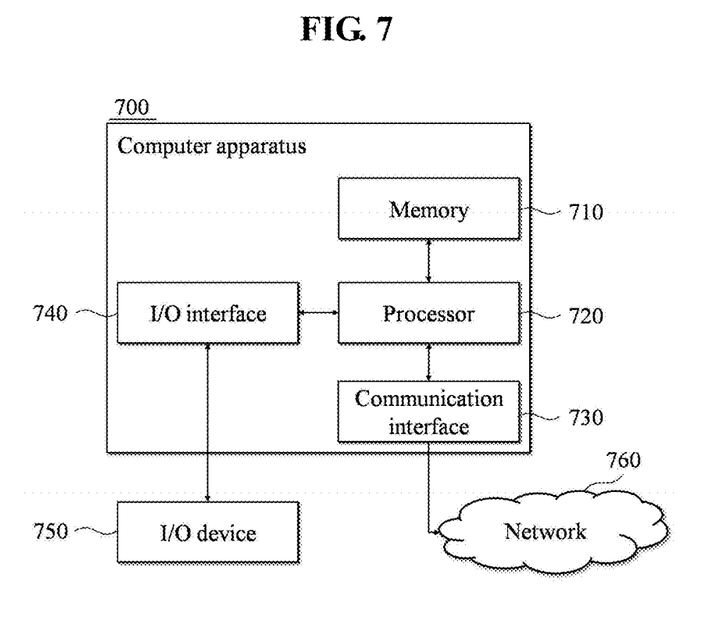
FIG. 7 is a diagram illustrating an example of a computer apparatus according to an example embodiment.
Figure 8:
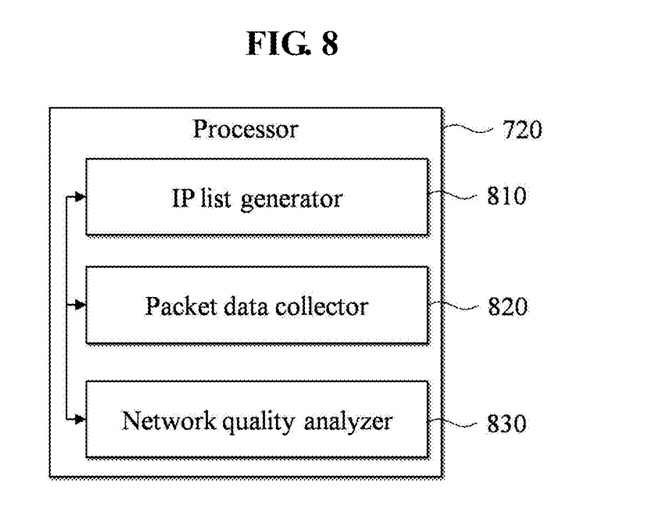
FIG. 8 is a diagram illustrating an example of elements of a processor according to an example embodiment.

FIG. 7 is a diagram illustrating an example of a computer apparatus according to an example embodiment. Referring to FIG. 7, the computer apparatus 700 may include a memory 710, a processor 720, a communication interface 730, and an input/output (I/O) interface 740. The memory 710 may include a permanent mass storage device, such as a random access memory (RAM), a read only memory (ROM), and a disk drive, as a non-transitory computer-readable storage medium. The permanent mass storage device, such as ROM and a disk drive, may be included in the computer apparatus 700 as a permanent storage device separate from the memory 710. Also, an OS or at least one program code may be stored in the memory 710. Such software components may be loaded to the memory 710 from another non-transitory computer-readable storage medium separate from the memory 710. The other non-transitory computer-readable storage medium may include a non-transitory computer-readable storage medium, for example, a floppy drive, a disk, a tape, a DVD/CD-ROM drive, a memory card, etc. According to other example embodiments, software components may be loaded to the memory 710 through the communication interface 730, instead of, or in addition to, the non-transitory computer-readable storage medium. For example, software components may be loaded to the memory 710 of the computer apparatus 700 based on a computer program installed by files received over a network 760.

The processor 720 may be configured to process computer-readable instructions of a computer program by performing basic arithmetic operations, logic operations, and I/O operations. The computer-readable instructions may be provided from the memory 710 or the communication interface 730 to the processor 720. For example, the processor 720 may be configured to execute received instructions in response to a program code stored in a storage device, such as the memory 710.

The communication interface 730 may provide a function for communication between the computer apparatus 700 and another apparatus, for example, the aforementioned storage devices, over the network 760. For example, the processor 720 of the computer apparatus 700 may transfer a request or an instruction created based on the program code stored in the storage device, such as the memory 710, data, a file, etc., to other devices over the network 760 under control of the communication interface 730. Inversely, a signal, an instruction, data, a file, etc., from another apparatus may be received at the computer apparatus 700 through the communication interface 730 of the computer apparatus 700 by going through the network 760. For example, a signal, an instruction, data, etc., received through the communication interface 730 may be transferred to the processor 720 or the memory 710, and a file, etc., may be stored in a storage medium, for example, the permanent storage device, further includable in the computer apparatus 700.

The I/O interface 740 may be a device for interfacing with an I/O device 750. For example, an input device of the I/O device 750 may include a device, such as a microphone, a keyboard, a camera, and a mouse, and an output device of the I/O device 750 may include a device, such as a display and a speaker. As another example, the I/O interface 740 may be a device for interfacing with an apparatus in which an input function and an output function are integrated into a single function, such as a touchscreen. The I/O device 750 may be configured as a single device with the computer apparatus 700.

According to other example embodiments, the computer apparatus 700 may include a number of components greater than or less than the number of components shown in FIG. 7. However, there is no need to clearly illustrate many components according to the related art. For example, the computer apparatus 700 may be configured to include at least a portion of the I/O device 750 or may further include other components, such as a transceiver and a database.

As described above, according to example embodiments, it is possible to improve the quality competitiveness by verifying and managing the quality of a network from a quality measurement server to a final user for each region covered by a cloud platform, such as a country, a city, and the like, ISP and/or ASN. Also, it is possible to achieve the average network quality in a desired section anywhere in the world through a method of attempting a session connection to ports of various types of open web servers in the world.

The systems and/or apparatuses described herein may be implemented using hardware components, software components, and/or a combination thereof. For example, a hardware component such as a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

Software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable storage mediums.

The methods according to the example embodiments may be recorded in non-transitory computer-readable media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be to act as one or more software modules in order to perform the operations of the above-described embodiments, or vice versa.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of measuring a quality of a global cloud network including a plurality of cloud platforms using a computer apparatus having at least one processor, the method comprising:
   generating an Internet protocol (IP) list of open web servers covered by at least one cloud platform and having at least one externally open port for each country;

collecting packet data through communication with each of the open web servers based on the IP list;

analyzing a network quality with respect to at least one region associated with the at least one cloud platform, an Internet service provider (ISP) of the at least one region, and an autonomous system number (ASN) of the at least one region based on the collected packet data; and providing the analyzed network quality of at least one of a region selected from the at least one cloud platform, the Internet service provider (ISP) of the selected region, and the ASN of the selected region, responsive to a switchable selection of the at least one region selected, the Internet service provider (ISP) of the selected region, and the ASN of the selected region.

2. The method of claim 1, wherein the IP list is generated by scanning open web servers having at least one externally open port based on IP band information for each ISP of a country for measuring the network quality.

3. The method of claim 1, wherein the collecting of the packet data comprises:
transmitting a request packet for requesting a session connection to an address generated based on an IP of the IP list and an externally open port;
receiving a response packet corresponding to the transmitted request packet from an open web server corresponding to the address; and
collecting information about the request packet and the response packet as the packet data.

4. The method of claim 3, wherein the collecting of the packet data comprises:
transmitting a hypertext transfer protocol (HTTP) packet through a session connected to the open web server corresponding to the address through the response packet;
receiving an HTTP response packet corresponding to the transmitted HTTP packet from the open web server corresponding to the address; and
further collecting information about the HTTP packet and the HTTP response packet as the packet data.

5. The method of claim 4, further comprising:
calculating a network latency for each of the open web servers based on the request packet and the response packet;
calculating an application latency for each of the open web servers based on the HTTP packet and the HTTP response packet; and
determining a portion in which a failure occurs between a network and an application through comparison between the network latency and the application latency in response to an occurrence of the failure.

6. The method of claim 1, wherein the collecting of the packet data comprises:
mapping the collected packet data to corresponding at least one of the selected region, the ISP of the selected region, and the ASN of the selected region; and
indexing the collected packet data.

7. The method of claim 1, wherein the analyzing of the network quality comprises:
calculating a latency for each of the open web servers based on the collected packet data; and
calculating an average latency corresponding to at least one of the selected region, the ISP of the selected region, and the ASN of the selected region.

8. The method of claim 1, further comprising:
providing a dashboard for displaying information about the analyzed network quality.

9. The method of claim 8, wherein the providing of the dashboard comprises:
receiving a selection on the at least one cloud platform for providing a service and the selected region to which the service is to be provided through a user interface of the dashboard; and
displaying an average latency corresponding to at least one of the region selected based on a latency calculated through the collected packet data, the ISP of the selected region, and the ASN of the selected region.

10. A non-transitory computer-readable record medium storing instructions that, when executed by a processor, cause the processor to perform the method of claim 1.

11. A computer apparatus comprising:
a memory configured to store a computer-readable instruction; and
at least one processor configured to execute the instruction,
wherein the at least one processor is configured to
generate an Internet protocol (IP) list of open web servers covered by at least one cloud platform and having at least one externally open port for each country,
collect packet data through communication with each of the open web servers based on the IP list,
analyze a network quality with respect to at least one region associated with the at least one cloud platform, an Internet service provider (ISP) of the at least one region, and an autonomous system number (ASN) of the at least one region based on the collected packet data, and
provide the analyzed network quality of at least one of a region selected from the at least one cloud platform, the Internet service provider (ISP) of the selected region, and the ASN of the selected region, responsive to a switchable selection of the at least one region selected, the Internet service provider (ISP) of the selected region, and the ASN of the selected region.

12. The computer apparatus of claim 11, wherein the at least one processor is further configured to generate the IP list by scanning open web servers having at least one externally open port based on IP band information for each ISP of a country for measuring the network quality.

13. The computer apparatus of claim 11, wherein the at least one processor is further configured to
transmit a request packet for requesting a session connection to an address generated based on an IP of the IP list and an externally open port,
receive a response packet corresponding to the transmitted request packet from an open web server corresponding to the address, and
collect information about the request packet and the response packet as the packet data.

14. The computer apparatus of claim 11, wherein the at least one processor is further configured to map the collected packet data to
corresponding at least one of the selected region, the ISP of the selected region, and the ASN of the selected region, and
index the collected packet data.

15. The computer apparatus of claim 11, wherein the at least one processor is further configured to
calculate a latency for each of the open web servers based on the collected packet data, and
calculate an average latency corresponding to at least one of the selected region, the ISP of the selected region, and the ASN of the selected region.

* * * * *